(12) United States Patent
Backus et al.

(10) Patent No.: US 7,739,948 B2
(45) Date of Patent: Jun. 22, 2010

(54) SIMPLIFIED DEVICE TO QUICKLY COOK FOOD

(75) Inventors: Alan L. Backus, Los Angeles, CA (US); Ronald M. Popeil, Beverly Hills, CA (US)

(73) Assignee: Ronco Acquisition Corporation, New York, NY (US)

( * ) Notice: Subject to any disclaimer, the term of this patent is extended or adjusted under 35 U.S.C. 154(b) by 446 days.

(21) Appl. No.: 11/735,905

(22) Filed: Apr. 16, 2007

(65) Prior Publication Data

US 2008/0092751 A1 Apr. 24, 2008

Related U.S. Application Data

(63) Continuation of application No. 10/039,395, filed on Nov. 7, 2001, now abandoned, which is a continuation of application No. 09/409,172, filed on Sep. 30, 1999, now abandoned, which is a continuation of application No. 08/889,021, filed on Jul. 7, 1997, now abandoned.

(51) Int. Cl.
*A47J 37/07* (2006.01)
*A47J 37/00* (2006.01)

(52) U.S. Cl. .............................. 99/340; 99/339; 99/419; 99/420; 99/348; 99/342; 99/426; 99/450; 99/467; 99/479; 126/25 R; 126/9 R

(58) Field of Classification Search .... 99/419 V–421 V, 99/339–40, 339, 340, 348, 426–450, 467–479, 99/419–21, 342, 421; 126/25 R, 9 R
See application file for complete search history.

(56) References Cited

U.S. PATENT DOCUMENTS

| | | | |
|---|---|---|---|
| 199,712 A | 1/1878 | Horrocks et al. | |
| 251,657 A | 12/1881 | Van | |
| 257,609 A | 5/1882 | Porter | |
| 427,671 A | 5/1890 | Carpenter | |
| 442,758 A | 12/1890 | Soden | |
| 504,256 A | 8/1893 | Strong | |
| 553,363 A | 1/1896 | Sickels | |
| 559,720 A | 5/1896 | Lacroix | |

(Continued)

FOREIGN PATENT DOCUMENTS

AT 223335 9/1962

(Continued)

OTHER PUBLICATIONS

Nonfinal Office Action for U.S. Appl. No. 10/039,395 dated May 31, 2002.

(Continued)

*Primary Examiner*—Shawntina Fuqua
(74) *Attorney, Agent, or Firm*—Connolly Bove Lodge & Hutz LLP

(57) ABSTRACT

A device to bake farinaceous foods such as cakes, cookies, breads, pies, and pizzas more rapidly and flavorfully, with retention of desire food textures and reduced risk of burning by the use of intermittent application of radiant energy. The preferred embodiment rotates farinaceous ingredients in front of a radiant heat source. The preferred embodiment may control oven temperatures by regulating the amount of outside cool air fan forced into the oven cavity.

4 Claims, 12 Drawing Sheets

U.S. PATENT DOCUMENTS

| | | |
|---|---|---|
| 616,694 A | 12/1898 | Arnold |
| 616,964 A | 1/1899 | Pickett |
| 693,725 A | 2/1902 | Leland |
| 714,430 A | 11/1902 | Worley et al. |
| 807,162 A | 12/1905 | Gardner |
| 848,018 A | 3/1907 | Engelhard |
| 904,382 A | 11/1908 | Van Patten |
| 961,543 A | 6/1910 | Sidgreaves |
| 1,045,049 A | 11/1912 | Longfellow et al. |
| 1,063,516 A | 6/1913 | Dunn et al. |
| 1,093,883 A | 4/1914 | Raillere |
| 1,584,121 A | 5/1926 | Moecker, Jr. et al. |
| 1,666,394 A | 4/1928 | Miglin |
| 1,723,704 A | 8/1929 | Morgan |
| 1,786,300 A | 12/1930 | Harrison |
| 1,976,989 A | 10/1934 | Grimes |
| 1,993,607 A | 3/1935 | Kalgren |
| 2,012,811 A | 8/1935 | Duffy |
| 2,048,769 A | 7/1936 | Anderson |
| 2,085,169 A | 6/1937 | Prood |
| 2,102,097 A | 12/1937 | Sherman |
| 2,130,259 A | 9/1938 | Bonaguidi |
| 2,133,667 A | 10/1938 | Mitchell |
| 2,136,658 A | 11/1938 | Westberg et al. |
| 2,142,390 A | 1/1939 | Zerr |
| 2,245,220 A | 6/1941 | Nelson |
| 2,297,825 A | 10/1942 | Bobo |
| 2,472,164 A | 6/1949 | Mannheimer |
| 2,501,104 A | 3/1950 | Smith |
| 2,502,685 A | 4/1950 | Warner |
| 2,565,967 A | 8/1951 | Jones |
| 2,607,286 A | 8/1952 | Krissel |
| 2,616,360 A | 11/1952 | Thompson |
| 2,618,730 A | 11/1952 | Panken |
| 2,619,951 A | 12/1952 | Kahn |
| 2,638,841 A | 5/1953 | Boyce |
| 2,649,852 A | 8/1953 | McCandless |
| 2,681,001 A | 6/1954 | Smith |
| 2,696,163 A | 12/1954 | Galley |
| 2,701,516 A | 2/1955 | Dorsey |
| 2,705,450 A | 4/1955 | Steinbook |
| 2,722,882 A | 11/1955 | Wilson |
| 2,727,315 A | 12/1955 | Candor |
| 2,754,401 A | 7/1956 | Edelman |
| 2,759,411 A | 8/1956 | Jenson |
| 2,760,428 A | 8/1956 | Boyajian |
| 2,762,293 A | 9/1956 | Boyajian |
| 2,809,579 A | 10/1957 | Theisen |
| 2,811,099 A | 10/1957 | McGoldrick |
| 2,815,707 A | 12/1957 | Morrow |
| 2,821,187 A | 1/1958 | Tescula |
| 2,827,847 A | 3/1958 | Shafter |
| 2,828,733 A | 4/1958 | Moore, Jr. |
| 2,831,420 A | 4/1958 | Radman |
| 2,831,421 A | 4/1958 | Mele |
| 2,839,989 A | 6/1958 | Persinger |
| 2,846,941 A | 8/1958 | Goodwin |
| 2,851,575 A | 9/1958 | Walston et al. |
| 2,867,163 A | 1/1959 | Bloom |
| 2,882,812 A | 4/1959 | Greenwald |
| 2,885,950 A | 5/1959 | Stoll et al. |
| 2,887,944 A | 5/1959 | Walker |
| 2,888,872 A | 6/1959 | Bathe |
| 2,895,408 A | 7/1959 | Glenny |
| 2,898,437 A | 8/1959 | McFarland |
| 2,917,988 A | 12/1959 | Harris |
| 2,925,081 A | 2/1960 | Shooter |
| 2,938,450 A | 5/1960 | Carpenter et al. |
| 2,939,383 A | 6/1960 | Kanaga |
| 2,940,380 A | 6/1960 | Rampel |
| 2,979,053 A | 4/1961 | Crispell et al. |
| 2,983,218 A | 5/1961 | Persinger et al. |
| 3,025,783 A | 3/1962 | Coudek |
| 3,045,581 A | 7/1962 | Bernstein |
| 3,070,953 A | 1/1963 | Carrel |
| 3,074,360 A | 1/1963 | Vaughan |
| 3,079,208 A | 2/1963 | Compton |
| 3,085,500 A | 4/1963 | Russell |
| 3,100,435 A | 8/1963 | Mobley, Jr. |
| 3,103,161 A | 9/1963 | Whitehead |
| 3,104,605 A | 9/1963 | McKinney |
| 3,121,424 A | 2/1964 | Russell |
| 3,125,015 A | 3/1964 | Schlaegel |
| 3,126,814 A | 3/1964 | Brown |
| 3,127,889 A | 4/1964 | Mills |
| 3,129,653 A | 4/1964 | Kertesz |
| D199,712 S | 12/1964 | Elliott |
| 3,181,453 A | 5/1965 | Moran |
| 3,182,585 A | 5/1965 | Rensch et al. |
| 3,188,939 A | 6/1965 | Smith |
| 3,196,776 A | 7/1965 | Norton |
| 3,205,812 A | 9/1965 | Booth |
| 3,215,338 A | 11/1965 | Schirmer |
| 3,240,147 A | 3/1966 | Farber et al. |
| 3,248,518 A | 4/1966 | Ogle, Jr. et al. |
| 3,269,299 A | 8/1966 | Nielsen |
| 3,276,351 A | 10/1966 | Sundholm |
| 3,285,238 A | 11/1966 | Norlie |
| 3,315,591 A | 4/1967 | Elliott |
| 3,329,082 A | 7/1967 | Satkunas |
| 3,333,529 A | 8/1967 | Wilson |
| 3,335,712 A | 8/1967 | Marasco |
| 3,348,471 A | 10/1967 | Lackenbauer et al. |
| 3,355,573 A | 11/1967 | Wilson |
| 3,362,320 A | 1/1968 | Marasco |
| 3,473,464 A | 10/1969 | Lasker |
| 3,503,323 A | 3/1970 | Swetlitz |
| 3,511,170 A | 5/1970 | O'Connor |
| 3,527,155 A | 9/1970 | Renn |
| 3,529,536 A | 9/1970 | Milhem |
| 3,559,565 A | 2/1971 | Getz |
| 3,566,777 A | 3/1971 | Koziol |
| 3,693,538 A | 9/1972 | Synder |
| 3,734,740 A | 5/1973 | Zenos |
| 3,782,268 A | 1/1974 | Navarro |
| 3,797,379 A | 3/1974 | Brion |
| 3,802,331 A | 4/1974 | Zickefoose |
| 3,805,762 A | 4/1974 | Nelson |
| 3,807,292 A | 4/1974 | Cinger |
| 3,812,840 A | 5/1974 | Whaler |
| 3,838,538 A | 10/1974 | Burford |
| 3,848,522 A | 11/1974 | Trelc |
| 3,867,605 A | 2/1975 | Yee |
| 3,867,877 A | 2/1975 | Zajc |
| 3,901,136 A | 8/1975 | Wilson et al. |
| 3,931,758 A | 1/1976 | Blake |
| 3,935,806 A | 2/1976 | Connolly |
| 3,935,807 A | 2/1976 | Main et al. |
| 3,939,761 A | 2/1976 | McGinty |
| 3,943,837 A | 3/1976 | Trkla |
| 3,959,620 A | 5/1976 | Stephen, Jr. |
| 3,980,010 A | 9/1976 | Collinucci |
| 4,005,646 A | 2/1977 | Krüper |
| 4,051,838 A | 10/1977 | Pinckney |
| 4,089,258 A | 5/1978 | Berger |
| 4,103,605 A | 8/1978 | Hemborg et al. |
| 4,103,606 A | 8/1978 | Gitcho |
| 4,106,473 A | 8/1978 | Wandel |
| 4,114,523 A | 9/1978 | Eff |
| 4,119,020 A | 10/1978 | Sharp et al. |
| 4,154,154 A | 5/1979 | Vivian |
| 4,158,992 A | 6/1979 | Malafouris |
| 4,163,894 A | 8/1979 | Scherer |
| 4,165,683 A | 8/1979 | Van Gilst |

| | | | | | |
|---|---|---|---|---|---|
| 4,165,684 A | 8/1979 | Wallace | 5,235,148 A | 8/1993 | Yamaguchi et al. |
| 4,176,592 A | 12/1979 | Doyle, Jr. | 5,235,903 A | 8/1993 | Tippmann |
| 4,181,074 A | 1/1980 | Hieb | 5,275,095 A | 1/1994 | Van Haren |
| 4,214,516 A | 7/1980 | Friedl et al. | 5,297,534 A | 3/1994 | Louden |
| 4,244,979 A | 1/1981 | Roderick | D347,762 S | 6/1994 | Bannigan |
| 4,270,444 A | 6/1981 | Geissmann | 5,325,767 A | 7/1994 | Beller |
| 4,286,133 A | 8/1981 | Einset et al. | 5,361,685 A | 11/1994 | Riccio |
| 4,300,443 A | 11/1981 | Morcos et al. | 5,361,686 A | 11/1994 | Koopman |
| 4,301,718 A | 11/1981 | Lewinger et al. | 5,367,950 A | 11/1994 | Sarich |
| 4,304,177 A | 12/1981 | Loeffler et al. | 5,373,778 A | 12/1994 | Moreth |
| 4,321,857 A | 3/1982 | Best | 5,373,809 A | 12/1994 | Sphar |
| 4,327,274 A | 4/1982 | White et al. | 5,379,685 A | 1/1995 | Krasznai |
| 4,335,289 A | 6/1982 | Smith | 5,390,588 A | 2/1995 | Krasznai et al. |
| 4,355,569 A | 10/1982 | Sage | 5,404,795 A | 4/1995 | Coble |
| 4,355,626 A | 10/1982 | Bailey et al. | 5,405,627 A | 4/1995 | Ito |
| 4,366,750 A | 1/1983 | Brown et al. | 5,410,948 A | 5/1995 | Eickmeyer |
| 4,372,199 A | 2/1983 | Brown et al. | 5,410,950 A | 5/1995 | Rone |
| 4,407,189 A | 10/1983 | Bentson | 5,417,148 A | 5/1995 | Cavallo |
| 4,409,452 A | 10/1983 | Oouchi et al. | 5,427,015 A | 6/1995 | Zittel |
| 4,410,553 A | 10/1983 | McGinty | 5,429,042 A | 7/1995 | Koopman |
| 4,418,261 A | 11/1983 | Jailor et al. | 5,431,093 A | 7/1995 | Dodgen |
| 4,421,016 A | 12/1983 | Sich | 5,441,037 A | 8/1995 | Yen |
| 4,442,763 A | 4/1984 | Beller | 5,442,999 A | 8/1995 | Meister |
| 4,450,758 A | 5/1984 | Belinkoff et al. | 5,445,064 A | 8/1995 | Lopata |
| 4,454,805 A | 6/1984 | Matthews | 5,445,065 A | 8/1995 | Lopata |
| 4,455,928 A | 6/1984 | Townsend | 5,447,096 A | 9/1995 | Bürge et al. |
| 4,470,343 A | 9/1984 | Didier | 5,447,620 A | 9/1995 | Pagnac et al. |
| 4,483,241 A | 11/1984 | Vaughn | 5,451,744 A | 9/1995 | Koopman et al. |
| 4,491,065 A | 1/1985 | Poulson | 5,465,653 A | 11/1995 | Riccio |
| 4,505,195 A | 3/1985 | Waltman | 5,469,782 A | 11/1995 | Wong |
| 4,508,024 A | 4/1985 | Perkins | 5,471,914 A | 12/1995 | Krasznai et al. |
| 4,520,791 A | 6/1985 | Chamberlain | 5,471,915 A | 12/1995 | Lopata |
| 4,548,130 A | 10/1985 | Diener et al. | 5,473,977 A | 12/1995 | Koether et al. |
| 4,555,986 A | 12/1985 | Eisenberg | 5,485,780 A | 1/1996 | Koether et al. |
| 4,556,046 A | 12/1985 | Riffel et al. | 5,497,697 A | 3/1996 | Promny |
| 4,562,771 A | 1/1986 | Williams | 5,515,773 A | 5/1996 | Bullard |
| 4,572,062 A | 2/1986 | Widdowson | 5,515,774 A | 5/1996 | Swisher et al. |
| 4,583,452 A | 4/1986 | Grosse | 5,518,127 A | 5/1996 | Warmack et al. |
| 4,585,661 A | 4/1986 | Brummett | 5,533,440 A | 7/1996 | Sher |
| 4,591,683 A | 5/1986 | Eke | 5,545,874 A | 8/1996 | Hansson |
| 4,600,254 A | 7/1986 | Whalen | 5,560,285 A | 10/1996 | Moreth |
| 4,625,634 A | 12/1986 | Krüper | 5,562,022 A | 10/1996 | Schmid et al. |
| 4,661,669 A | 4/1987 | Matsushima et al. | 5,566,997 A | 10/1996 | Lin |
| 4,688,541 A | 8/1987 | Stephen et al. | 5,575,196 A | 11/1996 | Masel et al. |
| 4,726,352 A | 2/1988 | Radke | 5,579,681 A | 12/1996 | Ubert et al. |
| 4,743,737 A | 5/1988 | Tateishi | 5,588,353 A | 12/1996 | Glucksman et al. |
| 4,817,514 A | 4/1989 | Hitch et al. | 5,592,869 A | 1/1997 | Zittel |
| 4,839,186 A | 6/1989 | Boyle | 5,598,582 A | 2/1997 | Andrews et al. |
| 4,867,051 A | 9/1989 | Schalk | 5,598,769 A | 2/1997 | Luebke et al. |
| 4,870,896 A | 10/1989 | Asahina et al. | 5,601,070 A | 2/1997 | Hotard et al. |
| 4,886,044 A | 12/1989 | Best | 5,611,265 A | 3/1997 | Ronci et al. |
| 4,889,972 A | 12/1989 | Chang | 5,619,909 A | 4/1997 | Volk |
| 4,924,766 A | 5/1990 | Hitch | 5,632,098 A | 5/1997 | Finch |
| 4,968,515 A | 11/1990 | Burkett et al. | 5,632,265 A | 5/1997 | Koziol |
| 4,986,174 A | 1/1991 | Gongwer | 5,634,559 A | 6/1997 | Foos et al. |
| 5,001,971 A | 3/1991 | Beller | 5,639,497 A | 6/1997 | Bedford et al. |
| 5,038,748 A | 8/1991 | Lockwood et al. | 5,665,258 A | 9/1997 | Hsu |
| 5,039,535 A | 8/1991 | Lang et al. | 5,669,290 A | 9/1997 | Natsumi et al. |
| 5,044,262 A | 9/1991 | Burkett et al. | 5,671,659 A | 9/1997 | Swindle |
| 5,058,493 A | 10/1991 | Basek et al. | 5,697,289 A | 12/1997 | Hackett |
| 5,134,927 A | 8/1992 | McCarthy, III et al. | 5,715,744 A | 2/1998 | Coutant |
| 5,136,933 A | 8/1992 | Derakhshan | 5,716,657 A | 2/1998 | Liebermann |
| 5,146,842 A | 9/1992 | Romano | 5,720,217 A | 2/1998 | Pappas |
| 5,148,737 A | 9/1992 | Poulson | D391,799 S | 3/1998 | Haring et al. |
| 5,163,358 A | 11/1992 | Hanagan et al. | 5,727,719 A | 3/1998 | Veliz et al. |
| 5,172,628 A | 12/1992 | Pillsbury et al. | 5,735,191 A | 4/1998 | Russell et al. |
| 5,176,124 A | 1/1993 | Wrasse | 5,740,722 A | 4/1998 | Emsens |
| 5,182,981 A | 2/1993 | Wilcox | 5,740,724 A | 4/1998 | Fabrikant et al. |
| 5,184,540 A | 2/1993 | Riccio | 5,746,116 A | 5/1998 | Smith |
| 5,193,444 A | 3/1993 | Bar-Sheshet | 5,761,991 A | 6/1998 | Kambies |
| 5,203,252 A | 4/1993 | Hsieh | D395,980 S | 7/1998 | Boisselier |
| 5,205,207 A | 4/1993 | McGuire | 5,778,766 A | 7/1998 | Wang |
| 5,205,208 A | 4/1993 | Gongwer | 5,780,815 A | 7/1998 | Mestnik et al. |

| | | | | | | |
|---|---|---|---|---|---|---|
| 5,785,046 | A | 7/1998 | Colla | 2007/0145061 A1 | 6/2007 | Backus et al. |
| 5,793,610 | A | 8/1998 | Schmitt et al. | | | |
| 5,798,505 | A | 8/1998 | Lee | FOREIGN PATENT DOCUMENTS | | |
| 5,799,569 | A | 9/1998 | Moreth | | | |
| 5,801,357 | A | 9/1998 | Danen | AT | 238395 | 2/1965 |
| 5,801,362 | A | 9/1998 | Pearlman et al. | CH | 424144 | 11/1966 |
| 5,802,962 | A | 9/1998 | Goldyn | CH | 603130 | 8/1978 |
| 5,809,995 | A | 9/1998 | Kobayashi et al. | CH | 662496 | 10/1987 |
| 5,819,639 | A | 10/1998 | Spell | DE | 657089 | 2/1938 |
| 5,845,563 | A | 12/1998 | Haring et al. | DE | 1162985 | 2/1964 |
| 5,881,640 | A | 3/1999 | Raevsager | DE | 43251 | 11/1965 |
| 5,887,513 | A | 3/1999 | Fielding et al. | DE | 1454014 | 11/1968 |
| 5,910,332 | A | 6/1999 | Fakieh | DE | 1998600 | 12/1968 |
| 5,918,534 | A | 7/1999 | Medina | DE | 1429829 | 4/1969 |
| 5,957,557 | A | 9/1999 | Langer et al. | DE | 1454157 | 8/1969 |
| 5,961,866 | A | 10/1999 | Hansen | DE | 1679001 | 3/1971 |
| 5,970,854 | A | 10/1999 | Tsai | DE | 7047203 | 4/1971 |
| D415,923 | S | 11/1999 | Hermansson | DE | 1779063 | 10/1971 |
| 5,974,956 | A | 11/1999 | McConnell | DE | 2205703 | 8/1972 |
| 5,981,926 | A | 11/1999 | Kim | DE | 7213693 | 8/1972 |
| 5,997,928 | A | 12/1999 | Kaish et al. | DE | 2307575 | 8/1973 |
| 6,009,797 | A | 1/2000 | Lin | DE | 2358119 | 5/1974 |
| 6,023,049 | A | 2/2000 | Huang | DE | 7407464 | 7/1974 |
| 6,038,965 | A | 3/2000 | Thorndyke | DE | 2308779 | 9/1974 |
| 6,041,694 | A | 3/2000 | Hsu | DE | 2310390 | 9/1974 |
| D422,172 | S | 4/2000 | Hsu | DE | 2425346 | 12/1975 |
| 6,047,633 | A | 4/2000 | Khaytman | DE | 2430233 | 1/1976 |
| 6,076,453 | A | 6/2000 | Hsu | DE | 2601877 | 7/1977 |
| 6,079,319 | A | 6/2000 | Doria | DE | 2646811 | 4/1978 |
| 6,079,322 | A | 6/2000 | Su | DE | 3000653 | 7/1981 |
| 6,080,967 | A | 6/2000 | Sandor et al. | DE | 3214818 | 11/1983 |
| 6,085,642 | A | 7/2000 | Terry | DE | 3235985 | 3/1984 |
| 6,119,586 | A | 9/2000 | Gongwer | DE | 3401002 | 7/1985 |
| 6,131,505 | A | 10/2000 | Lin | DE | 3606800 | 9/1987 |
| 6,138,553 | A | 10/2000 | Toebben | DE | 4112325 | 1/1992 |
| D433,867 | S | 11/2000 | Hsu | DE | 4226098 | 4/1993 |
| 6,142,064 | A * | 11/2000 | Backus et al. ............. 99/421 H | DE | 4413050 | 6/1995 |
| D434,939 | S | 12/2000 | To | DE | 29602405 | 5/1996 |
| 6,167,800 | B1 | 1/2001 | Su | DE | 29909108 | 8/1999 |
| 6,170,390 | B1 | 1/2001 | Backus et al. | DE | 29916242 | 12/1999 |
| 6,173,645 | B1 * | 1/2001 | Backus et al. ............... 99/427 | DE | 29916161 | 1/2000 |
| 6,178,879 | B1 | 1/2001 | Park | EP | 281866 | 9/1988 |
| 6,182,560 | B1 | 2/2001 | Andress | EP | 332505 | 9/1989 |
| 6,240,838 | B1 | 6/2001 | Backus et al. | EP | 396470 | 11/1990 |
| 6,250,211 | B1 | 6/2001 | Gongwer | EP | 1222889 | 7/2002 |
| 6,250,214 | B1 | 6/2001 | Backus et al. | EP | 1535556 | 6/2005 |
| 6,253,665 | B1 | 7/2001 | Backus et al. | EP | 1700550 | 9/2006 |
| 6,257,128 | B1 | 7/2001 | Chen | ES | 2029576 | 8/1992 |
| 6,279,165 | B1 | 8/2001 | Kobayashi | FR | 853400 | 3/1940 |
| 6,330,855 | B2 | 12/2001 | Backus et al. | FR | 1116586 | 5/1956 |
| 6,393,972 | B1 * | 5/2002 | Backus et al. ............. 99/421 R | FR | 1218203 | 5/1960 |
| 6,408,742 | B1 | 6/2002 | Backus et al. | FR | 1265159 | 5/1961 |
| 6,422,136 | B1 | 7/2002 | Backus et al. | FR | 1300126 | 6/1962 |
| 6,450,087 | B2 | 9/2002 | Backus et al. | FR | 2078609 | 11/1971 |
| 6,536,334 | B2 | 3/2003 | Backus et al. | FR | 2276799 | 1/1976 |
| 6,568,315 | B2 | 5/2003 | Backus et al. | FR | 2477396 | 9/1981 |
| 6,568,316 | B1 | 5/2003 | Backus et al. | FR | 2498915 | 8/1982 |
| 6,658,991 | B2 | 12/2003 | Backus et al. | FR | 2603178 | 3/1988 |
| 6,742,445 | B2 | 6/2004 | Backus et al. | FR | 2625668 | 7/1989 |
| 6,782,805 | B2 | 8/2004 | Backus et al. | GB | 478044 | 1/1938 |
| 6,782,806 | B2 | 8/2004 | Backus et al. | GB | 850083 | 9/1960 |
| 6,837,150 | B2 | 1/2005 | Backus et al. | GB | 880899 | 10/1961 |
| 6,874,408 | B2 * | 4/2005 | Backus et al. ............... 99/327 | GB | 996233 | 6/1965 |
| 6,965,095 | B1 | 11/2005 | Popeil et al. | GB | 1257945 | 12/1971 |
| 6,988,445 | B1 * | 1/2006 | Backus et al. ............. 99/421 H | IT | 555893 | 1/1957 |
| 7,021,203 | B2 * | 4/2006 | Backus et al. ............. 99/421 H | JP | 60-49785 | 3/1985 |
| 7,021,204 | B2 * | 4/2006 | Backus et al. ............. 99/421 H | JP | 61-22133 | 1/1986 |
| 7,138,609 | B2 | 11/2006 | Popeil et al. | KR | 206810 | 12/2001 |
| 7,225,729 | B2 | 6/2007 | Backus et al. | SE | 323756 | 5/1970 |
| 7,225,730 | B2 * | 6/2007 | Backus et al. ............. 99/419 | SE | 500872 | 9/1994 |
| 7,325,484 | B1 * | 2/2008 | Backus et al. ............. 99/421 H | WO | 8604978 | 8/1986 |
| 2005/0178275 | A1 | 8/2005 | Backus et al. | | | |
| 2006/0144248 | A1 | 7/2006 | Backus et al. | | | |

WO 0028869 5/2000

OTHER PUBLICATIONS

Final Office Action for U.S. Appl. No. 10/039,395 dated Feb. 25, 2003.
Nonfinal Office Action for U.S. Appl. No. 10/039,395 dated Jul. 27, 2006.
Final Office Action for U.S. Appl. No. 10/039,395 dated Jan. 17, 2007.
Dorman, et al., *Advantage Partners, LLC v. Salton, Inc., et al.* "Ex Parte Application for Temporary Restraining Order and Order to Show Cause Re Preliminary Injunction", Dated Feb. 2, 2001; (6) Pages.
Hankin, et al. *Advantage Partners, LLC v. Salton, Inc., et al.* "Defendant Salton, Inc.'s Opposition to Plaintiff's Ex Parte Application for Temporary Restraining Order and Order to Show Cause Re Preliminary Injunction" Dated Feb. 6, 2001; (18) Pages.
Dorman, et al., *Advantage Partners, LLC v. Salton, Inc., et al.* "Plaintiff's Reply to Salton's Opposition to Ex Parte Application for Temporary Restraining Order and Order to Show Cause Re Preliminary Injunction", Dated Feb. 7, 2001: (31) Pages.
Dorman, et al., *Advantage Partners, LLC v. Salton, Inc., et al.* "Ex Parte Order Granting Application for Temporary Restraining Order and Order to Show Cause Re Preliminary Injunction", Dated Feb. 9, 2001; (5) pages.
Dorman, et al., *Advantage Partners, LLC v. Salton, Inc., et al.* "Final Consent Judgement and Permanent Injuction Against Defendant Salton, Inc."; Dated Feb. 20, 2001; (9) pages.
Farberware Millennium Use & Care Instructions Vertical Rotisserie FSR150; Dated Apr. 1998; (11) Pages.
Hankin, et al., *Advantage Partners, LLC v. Salton, Inc., et al.*, "Defendants' Opposition to Plaintiffs Ex Parte Application for Temporary Restraining Order and Order to Show Cause Re Preliminary Injunction"; Dated Jul. 16, 2001; (36) Pages.
Wytsma, et al., *Advantage Partners, LLC v. Salton, Inc., et al.* "Defendants' Amended Opposition to Plaintiffs Ex Parte Application for Temporary Restraining Order and Order to Show Cause Re Preliminary Injunction"; Dated Aug. 1, 2001; (30) Pages.
Wytsma, et al., *Advantage Partners, LLC v. Salton, Inc., et al.* "Supplemental Opposition to Plaintiff' Ex Parte Application for Temporary Restraining Order and Order to Show Cause Re Preliminary Injunction"; Dated Aug. 1, 2001; (23) Pages.
Hatter, Jr., *Advantage Partners, LLC v. Salton, Inc., et al.* "Temporary Restraining Order"; Dated Aug. 13, 2001; (3) Pages.
Wytsma, et al., *Advantage Partners, LLC v. Salton, Inc., et al.* "Defendants' Opposition to Plaintiff Advantage Partners' Request for Preliminary Injunctive Relief"; Dated Aug. 17, 2001; (26) Pages.
Dorman, et al., *Advantage Partners, LLC v. Salton, Inc., et al.* "Reply Brief in Support of Plaintiff's Application for Preliminary Injunction"; Dated Aug. 22, 2001; (26) Pages.
Dorman, et al., *Advantage Partners, LLC v. Salton, Inc., et al.* "Memorandum of Points and Authorities in Support of Motion for Preliminary Injunction Against Defendant Salton, Inc. for Infringement of the '390 Patent"; Dated Oct. 22, 2001; (31) Pages.
Sigale, et al., *Advantage Partners, LLC v. Salton, Inc., et al.* "Defendant Salton, Inc.'s Opposition to Plaintiff Advantage Partners LLC's Motion for Preliminary Injunction"; Dated Oct. 29, 2001; (33) Pages.

* cited by examiner

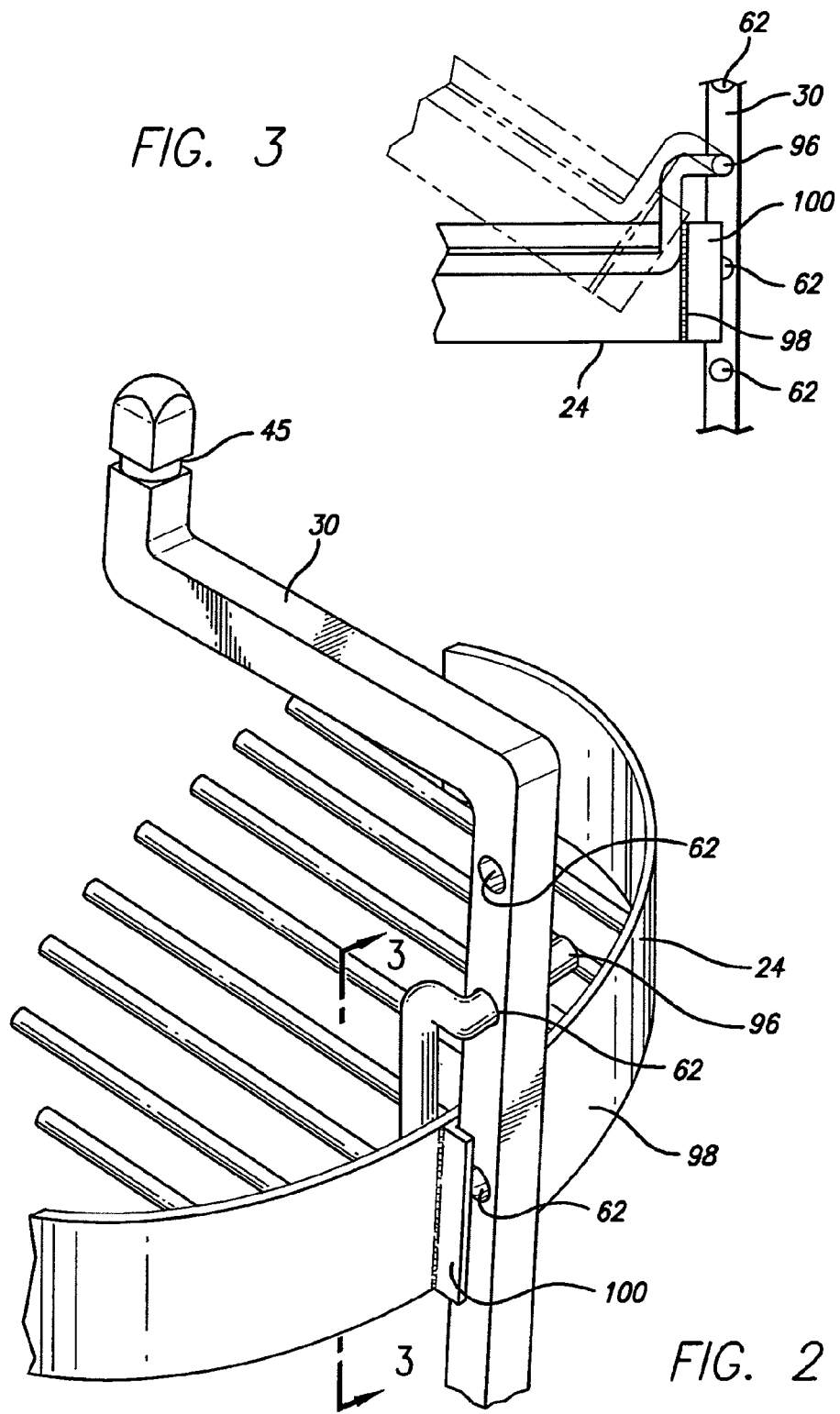

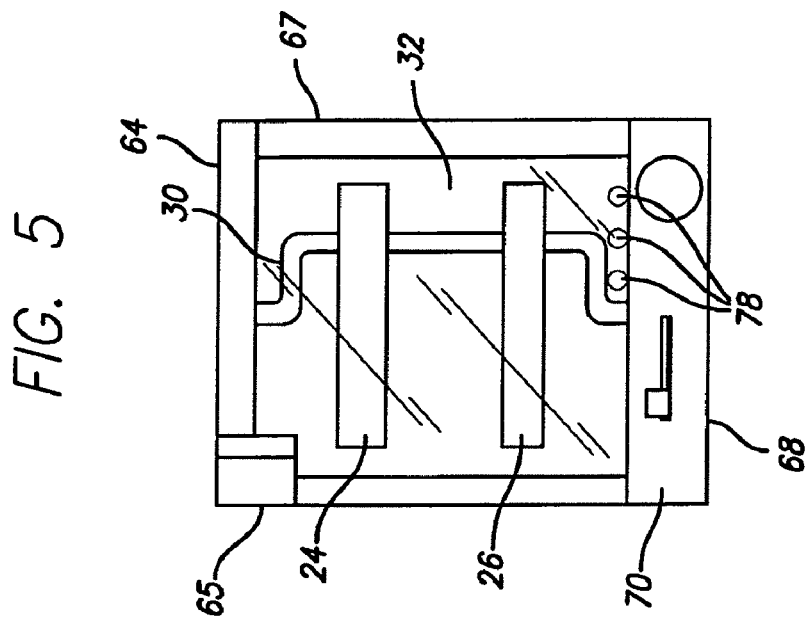
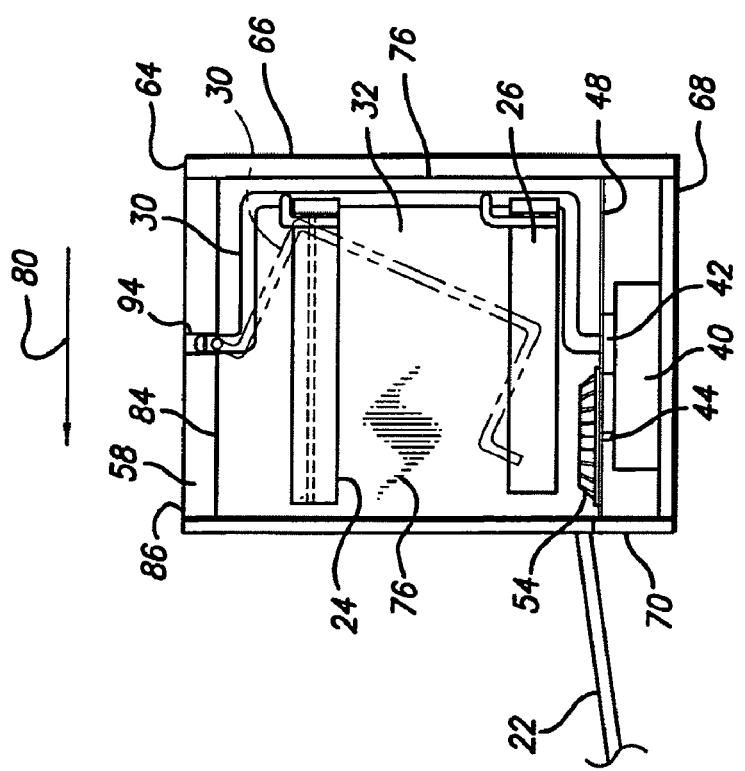

SIMPLIFIED DEVICE TO QUICKLY COOK FOOD

CROSS-REFERENCE TO RELATED APPLICATION(S)

This application is a continuation of U.S. patent application Ser. No. 10/039,395, filed Nov.7, 2001; which is a continuation of U.S. patent application Ser. No. 09/409,172, filed Sep.30, 1999, now abandoned; which is a continuation of U.S. patent application Ser. No. 08/889,021, filed Jul. 7, 1997, now abandoned; the entireties of which are hereby incorporated by reference.

FIELD OF THE INVENTION

The present invention relates to devices to bake and cook foods, and more particularly to devices that use: food movement, radiant energy, and heat energy to bake and cook farinaceous and other food products.

BACKGROUND OF INVENTION

Baking of farinaceous foods such as cakes, cookies, breads, pies, and pizzas, has changed little in the last several hundred years. Modern ovens still heat air inside a cooking cavity and transfer cooking energy to the farinaceous article being baked using the heated air.

There are several problems with this method of cooking. First, ovens using this method are inherently slow because they must, in sequence, activate a heater, such as an electrical coil, which then heats air, which then moves to the food being cooked, and transfers its heat to the food being cooked. Each step in this process is time consuming resulting in a long overall process. The process is also very inefficient.

Current variations on this method include moving the hot air inside the cooking cavity by using a fan, also referred to as convection cooking, and by using microwave energy to help speed the baking process.

Adding air movement, as in convection cooking, only helps reduce the time it takes to move the hot air from the heater to the food being cooked and to transfer the heat from the hot air to this food. The heater must still be activated to heat the air used to cook the food.

Adding microwave cooking to conventional ovens reduces baking times, but may unfavorably change the taste and texture of the foods being cooked, as for example, by making bread become rubbery.

What is needed is a method of cooking cakes, cookies, breads, pies, and pizzas as well as other foods, which reduces cooking times and increases cooking efficiency, while maintaining or enhancing food textures and flavors. A further benefit of the this method should be that it is simple to use and forgiving to an unskilled user. Versatility in offering other modes of cooking would also be desirable.

SUMMARY OF THE INVENTION

A preferred embodiment of the method of cooking of the present invention uses intermittent exposure to a radiant heat source to quickly and flavorfully bake foods and especially farinaceous foods such as cakes, cookies, breads, pies, and pizzas. In the preferred embodiment, foods to be baked are rotated in front of a glowing electric heat coil. By exposing foods to be baked intermittently to radiant heat rather than using other baking methods such as those described above, cooking times may be diminished, risks of foods being burned can be reduced, total energy conveyed to the food may be increased, and flavor and texture can be enhanced.

A cycle where the food is exposed to radiant heat about 20% to 70% of the cycle is advantageous in achieving the above results. More than 70% results in burning similar to using steady radiant energy, and less than 20% generally significantly increases cooking times.

Likewise a cycle time between 15 and 60 seconds helps in optimizing the above results. Again, less than 15 seconds tends to burn the food being baked. More than 60 seconds may increase cooking times significantly. More than 60 seconds may also increase the tendency of foods to burn.

Radiant transfer of heat is among the fastest and most efficient means of transferring cooking energy. It eliminates the baking and cooking steps of heating air and then having the hot air heat the foods being cooked. Instead energy is transferred directly from a radiant source to the food being cooked with no intermediate steps.

However, generally radiant cooking burns the surface of the food being cooked while leaving food interiors unheated. This can easily be seen when cooking foods over a campfire or under an oven broiler. This is especially true when baking farinaceous foods such as cakes, cookies, breads, pies, and pizzas.

Cycling radiant energy intermittently on and off gives time for radiant heat energy to be absorbed into foods being cooked while not over-heating their exterior surfaces. As an example, when foods are placed in continuous contact with radiant energy, such as under an oven broiler, their surfaces heat very quickly often forming a crust that may burn. Cycling radiant heat gives a chance for heat to penetrate into the food while not over-heating the food's surface.

The preferred embodiment may be used for types of cooking other than baking farinaceous foods. As examples it may be used to rotisserie cook meats, vegetables, and other foods; either vertically or horizontally and it may be used to bake or broil foods on a fixed shelf by steadily or intermittently activating the radiant heater. When intermittent activation is made, best results are achieved by employing the above described duty cycles and cycle times.

Shifting between horizontal and vertical cooking and rotisserie modes merely involves tipping the cooking device over 90 degrees. Depending on embodiment size, this may be a simple hand operation tipping the device from resting on one face to resting on an adjoining face.

The preferred embodiment has an air movement system that helps speed cooking by circulating air past foods being cooked.

This system allows a greater amount of radiant heat to be used in cooking by introducing cool outside air into the oven cavity to lower dangerously high oven temperatures. This system controls oven temperatures by regulating the amount of cooler outside air introduced into the oven cavity through use of an air valving mechanism. This system also allows operation of the oven below over-counter kitchen cabinets by dissipating hot air through air exits located in the lower portion of the oven away from overhead cabinets.

Likewise this system reduces exterior wall temperatures by dissipating heat released from the oven cavity over large exterior side wall surfaces rather than just venting very hot stratified hot air from the top of the oven.

This air movement system is simple in construction, using a motor drive mechanism to propel a guarded radial fan blade with user controlled variable openings to regulate the amount of cool outside air introduced into the oven cavity.

When combined with moving food, as an example rotating food past a radiant heater, this simple hot air movement system makes baking and cooking in general surprisingly even within the cooking cavity while substantially decreasing cooking times when compared to conventional convection cooking. As an example, an angel food cake which normally takes 29 to 36 minutes to bake can be finished to a tasty golden brown in just 18 minutes.

Conventional convection baking takes significantly longer (generally about 21 minutes).

Convenience is enhanced by a simple cantilever shelf mounting mechanism which has no center pole and only one side-mounted vertical support member which easily swings into place in the oven cavity to mount. Likewise the vertical and horizontal mounting of spits for rotisserie cooking is easily accomplished through a similar rotation into place of the spit rod within the oven cavity.

The shelf height within the oven cavity is easily adjustable through use of multiple mounting holes on the vertical support member. A removable oven wall allows an extended wall 38 to be mounted to the oven thus increasing the size of its oven cavity to handle larger food items such as a large turkey while limiting the overall size of the embodiment during the majority of its uses.

Even baking is further enhanced by introduction of a metal skirt around the cooking shelf. This blocks radiant energy from the heater which otherwise might burn the outer edges of food articles. Cleaning the oven is made easier by removable walls and a removable drip tray.

BRIEF DESCRIPTION OF THE DRAWINGS

FIG. 2 is a partial detail view shown in perspective of the drive arm and cooking shelf showing how the cooking shelf attaches to the drive arm.

FIG. 3 is a cross-section view of the drive arm and cooking shelf of FIG. 2 taken along line 3-3.

FIG. 4 is a cross-section view taken along line 4-4 of FIG. 1 showing how the drive arm is mounted into the oven cavity.

FIG. 5 is a front view of the oven FIG. 1 showing it being used to bake using its cooking shelf and drip tray.

DETAILED DESCRIPTION OF THE INVENTION

Referring to FIGS. 1 to 10, a preferred embodiment 20 of the present invention comprises a generally rectangular enclosure 64 with a demountably hinged transparent plastic front door 22 (see FIGS. I and 4).

Figure 1:
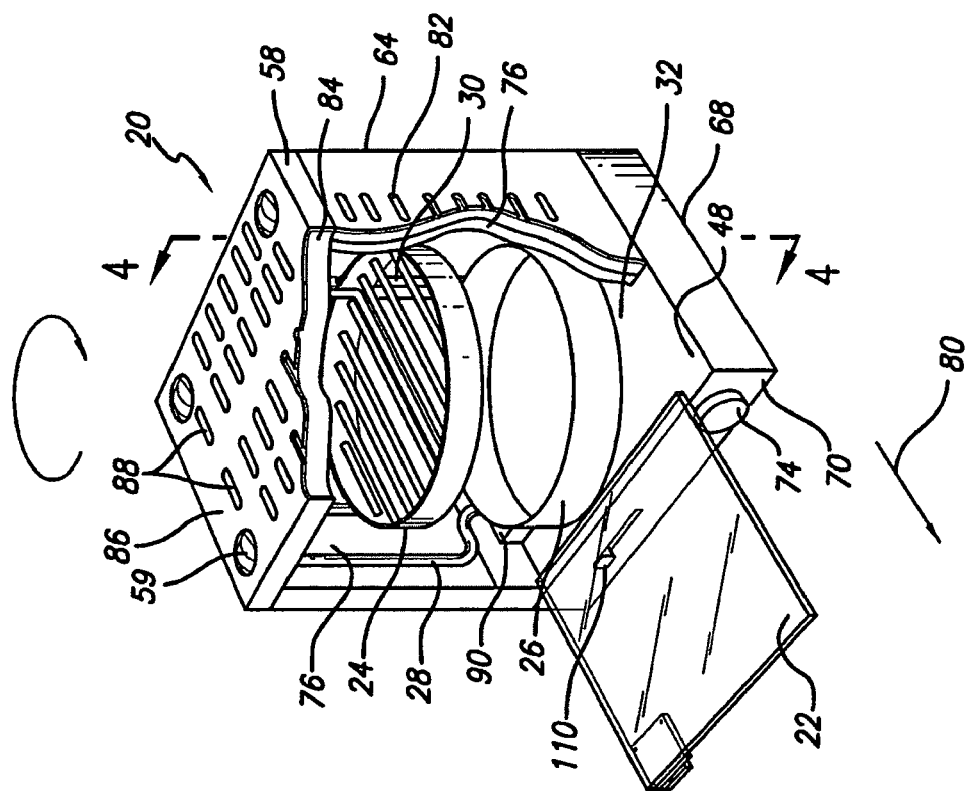
FIG. 1 is a perspective view of a preferred embodiment of the present invention with the front door open and showing the cooking shelf, drip tray and heater inside.
Figure 6:
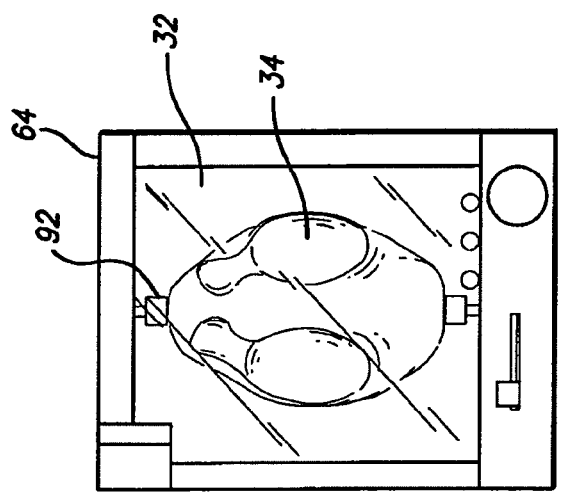
FIG. 6 is a front view of the oven of FIG. 1 showing it being used for vertically rotisserie cooking a turkey.

Although the embodiment may be constructed at any scale, referring to FIG. 1, a height of about 15 inches, a width of about 14 inches, and a depth of about 12 inches would be advantageous when using the embodiment on a kitchen counter top. Such dimensions leave adequate space to safely clear overhead cabinets without touching or conveying unsafe amounts of heat, while also allowing counter space in front 80 of the embodiment for working, and while maximizing oven cavity space for baking and rotisserie cooking large food items such as a 13 pound turkey in the embodiment's standard mode or a 20 pound turkey in the embodiment's extended mode using the embodiment's extension 38.

The enclosure 64 has double walls on all sides except the e front 80 which is closed by the plastic front door 22. Referring to FIG. 1, the outer side walls 65, 66, 67 are molded integrally with the bottom outer wall 68 and lower portion of the front wall 70. This integral molding promotes strength while use of ventilated 82 plastic along with the fan 50 drive and ventilated 78 inner walls 76 helps keep outer side walls 65, 66, 67 cooler to the touch.

A metal floor 72 is positioned above the bottom outer wall 68 with the motor drive mechanism 40 and a timer 74 mounted in the space between the floor 72 and bottom outer wall 68.

A removable metal generally "U" shaped inner skin 76 bends inside of the three outer side walls 65, 66, 67 and forms the inner of the double side walls of the enclosure 64. This inner skin 76 is shiny on its surface facing the cooking cavity 32 and has vents 78 (see FIGS. I and 5) along portions of its edge which are adjacent to the metal floor 72 and are in the lower portion of the oven cavity 32 both when the embodiment is being used in either its vertical (FIGS. 1, 4, 5 and 6) and horizontal (FIGS. 7, 8 and 10) operating modes.

During operation, the embodiment vents hot air out of the oven cavity 32 in response to cool outside air being introduced into the oven cavity 32 by the fan 50. This exiting hot air passes through the vents 78 in the inner side walls 76 and out through slots 82 in the outer side walls 65, 66, 67. This venting along with the fan 50 induced air movement helps control and even out oven and outer wall 65, 66, 67 temperatures. It also helps reduce humidity within the cooking cavity 32.

Referring to FIG. 1, the top of the embodiment is capped by a twin-skinned removable oven wall 58. The inner skin 84 of this wall 58 is made of metal while the outer skin 86 is made from molded plastic that has extensive venting 88 across its surface.

Figure 8:
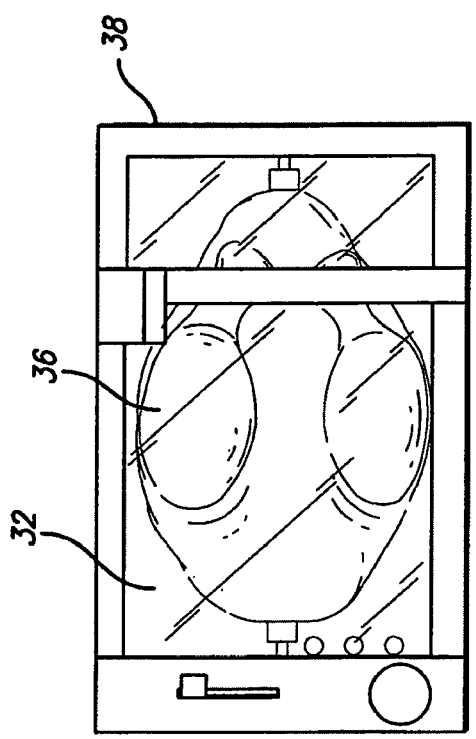
FIG. 8 is a front view of the oven of FIG. 1 showing it being used for horizontally rotisserie cooking a large turkey using an extension to the oven cavity.

As shown in FIG. 8, this removable oven wall 58 may be replaced with an extension 38 to enlarge the oven cavity 32 to cook more food or to cook larger articles of food such as the large turkey 36 illustrated in FIG. 8.

The removable oven wall 58 is held in place with four finger operated screws 59. This wall 58 may be removed for dishwasher or other cleaning, or for other purposes.

Removing this capping wall 58 also allows the "U" shaped inner skin 76 to be lifted out of the oven cavity 32 for dishwasher or other cleaning, or for other purposes.

Located in the metal floor 48 of the oven cavity 32 are: the plug receptacle 90 for the heat coil 28, the rod drive socket 42, and the fan 50 covered by the fan cover 54.

The heat coil 28 is plugged into the plug receptacle 90 and rises orthogonal to the metal oven floor 48 into the oven cavity 32 and adjacent to one of its 32 sides (see FIG. 1).

Figure 7:
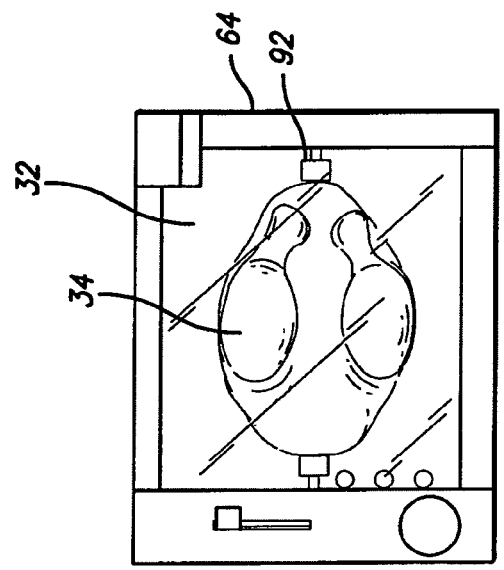
FIG. 7 is a front view of the oven of FIG. 1 showing it being used for horizontally rotisserie cooking a turkey.

A shelf 24 supporting drive arm 30 or a cooking spit 92 may be inserted into the rod drive socket 42 by first pushing one end of either the arm 30 or the spit 92 into a central hole 94 in the capping wall 58 (see FIG. 4), then swinging the opposite end over the drive socket 42 (see FIG. 4), and then lowering this opposite end into the socket 42. Annular grooves 45, one each located near either end of the drive arm 30 or spit 92, locate the arm 30 or spit 92 into the central hole 94 in the inner skin 84 of the capping wall 58 and prevent lateral movement which would disengage the drive socket 42 from the drive arm 30 or spit 92 when the embodiment is operated in the horizontal mode as illustrated in FIGS. 7 and 8. Gravity prevents the arm 30 or spit 92 from dislodging from the socket 42 when the embodiment is operated in its vertical mode as illustrated in FIGS. 1, 4, 5 and 6.

The food support shelf 24 conveniently is cantilevered off the crankshaft shaped drive arm 30 (see FIGS. 1 and 2). This makes the entire shelf useable with no central support member, and allows easy access to the shelf 24 (or shelves) around over 350 degrees of its 24 (or their) perimeter(s).

The drive socket 42 is driven at about three RPM by a gear 46 reduced motor 43 drive.

A drip tray 26, which makes cleanup easier, may be mounted to the drive arm 30 in a similar manner to the food support shelf 24. This tray 26, like the shelf, may be conveniently removed for dishwasher or other cleaning, or for other purposes.

Holes 62 in the drive arm 30 engage a pin 96 coupled to the shelf 24 and permit the shelf 24 to be raised or lowered or removed. The shelf 24 is further steadied and supported by a shallow "U" shaped channel 100 attached to the shelf's 24 outer skirt 98. Mounting the shelf 24 is illustrated in FIG. 3. The pin 96 is inserted into a hole 62 when the shelf 24 is in a raised position. The shelf 24 is then lowered, engaging the channel 100 around the inside surfaces of the drive arm 30 and securing the shelf 24 in position for cooking.

The skirt 98 helps even out radiant baking and cooking by controlling exposure to radiant heat foods receive particularly next to the outer perimeter of the shelf 24. The skirt 98 thus helps make baking and cooking even and consistent across the entire surface of the shelf 24 by blocking some of the harshest radiant heat. The top and/or bottom of this skirt 98 may have holes, slots or other contours to balance the radiant cooking energy received by the foods being cooked.

Figure 10:
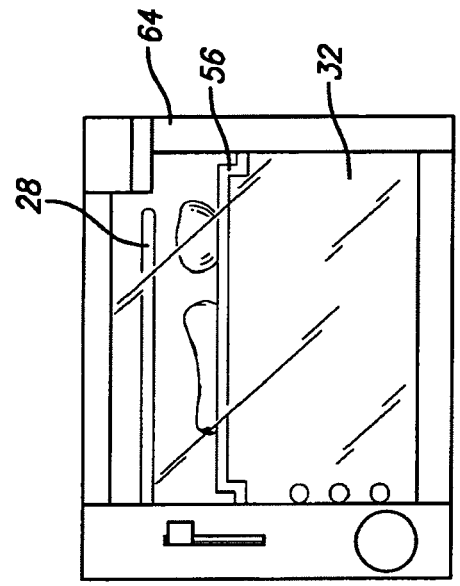
FIG. 10 is a front view of the oven of FIG. 1 being used with a fixed shelf.

A conventional rectangular drip tray may be used in the bottom of the oven cavity 32 to help in cleanup when the embodiment is operated in its horizontal mode as illustrated in FIGS. 7, 8 and 10.

Oven temperatures may be controlled by the amount of outside cool air introduced into the oven cavity 32 by the fan 50. Holes 102 located in the oven floor 48 directly below, and midway out, the fan blade 50 permit outside cool air to be pulled into the oven cavity 32 by the fan 50.

An air valve plate 52 located just beneath these holes 102 is penetrated by openings 104 which align with the holes 102 in the oven floor 48. This plate 52 may rotate 106 about a central axis 108 regulating the amount of air which may pass through the holes 102 in the floor 48. This is as a result of the rotation 106 of the valve plate 52 causing holes 102 in the floor 48 to come into and out of alignment with the openings 104 in the valve plate 52.

The more cool outside air which passes into the oven cavity 32 through the holes 102 in the oven floor 48, the cooler the oven cavity 32 becomes. Valve plate 52 rotation is controlled by a lever 110 which passes through the lower front wall 70 of the embodiment (see FIG. 1). Movement of this lever 110 thus regulates oven temperature.

Rotisserie cooking on a horizontal spit has long been recognized for superior flavor and its health benefits. Rotisserie cooking on a vertical axis is less popular but is used in several Middle Eastern dishes. It too generally has outstanding flavor and many health benefits. Both forms of rotisserie, horizontal and vertical, have unique character and advantages touted by their chef users. As an example, horizontal rotisserie generally self baste, where vertical rotisserie baste far less.

The preferred embodiment offers both vertical and horizontal rotisserie cooking thus offering the unique advantage of both.

A timer 74 also is located adjacent to the temperature control lever 110 in the lower front wall 70. This timer may be set for a predetermined period and automatically turns the embodiment off when the period expires. This timer also has a feature allowing the oven to be left on for an undetermined time span.

Embodiment operation is simple. The door 22 is opened and food to be baked or cooked is placed on a shelf 24 or on a spit 92 inside the oven cavity. The door 22 is then closed and the oven temperature is set using the lever 110 located on the front 70 of the embodiment. The timer is set and the user is then free to walk away. When the cook time is completed, the timer sounds and automatically turns the embodiment off. The food is then removed and eaten.

Cleanup, when necessary, is accomplished by removing the shelf 24 and drive arm 30 or spit 92, demounting the removable oven wall 58, and lifting out the "U" shaped removable inner skin 76. These can then be cleaned and reassembled.

Figure 15:
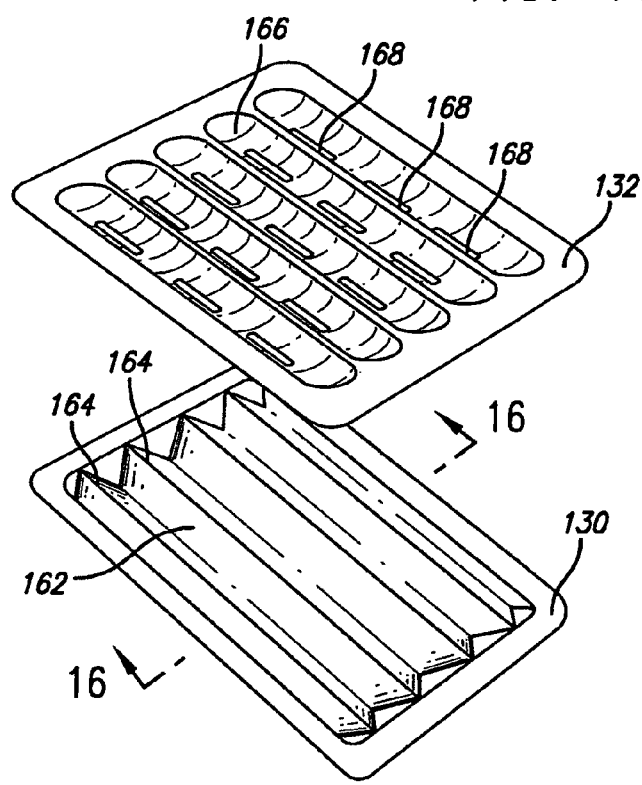
FIG. 15 is an exploded perspective view of the drip pan and optional drip pan cover.
Figure 16:
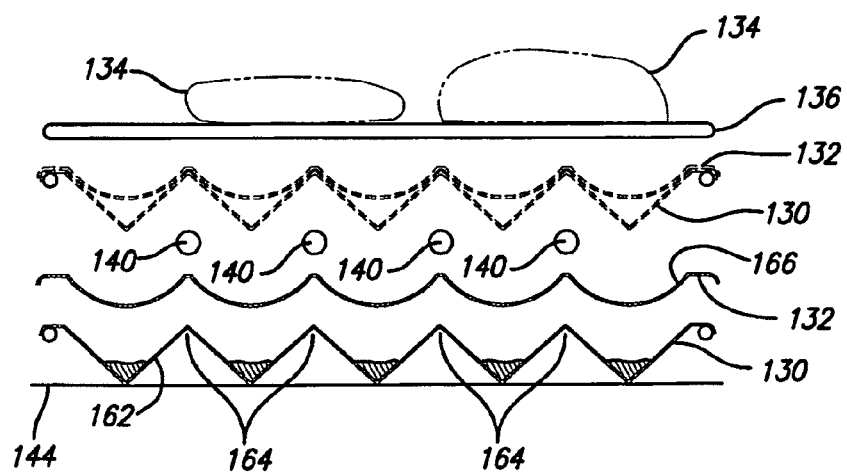
FIG. 16 is a cross section view through the drip pan and optional drip pan cover taken along line 16-16 of FIG. 15 showing the pan position while grilling food on a wire shelf, and in dotted lines, the position of the drip pan and optional drip pan cover while baking cakes, cookies, etc.
Figure 17:
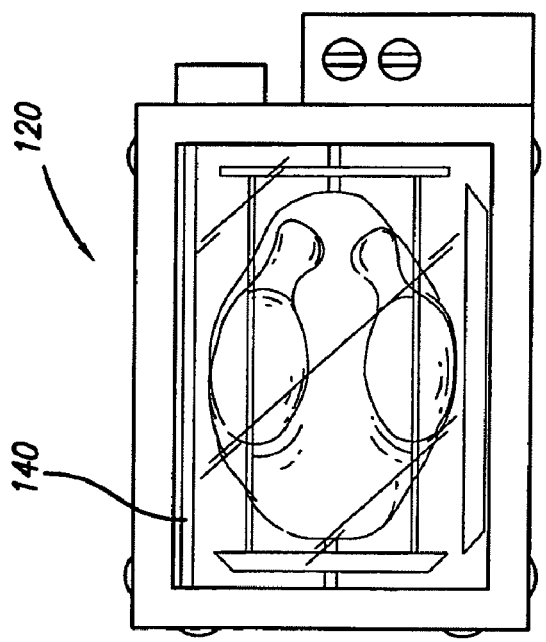
FIG. 17 is a front view of the oven of FIG. 11 positioned for horizontal rotisserie cooking.
Figure 18:
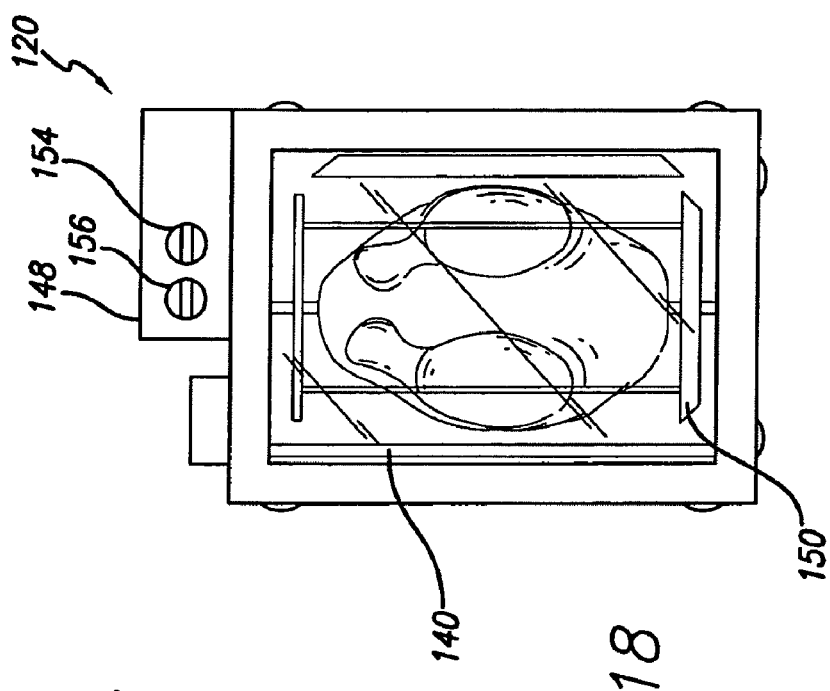
FIG. 18 is a front view of the oven of FIG. 11 positioned for vertical rotisserie cooking.
Figure 19:
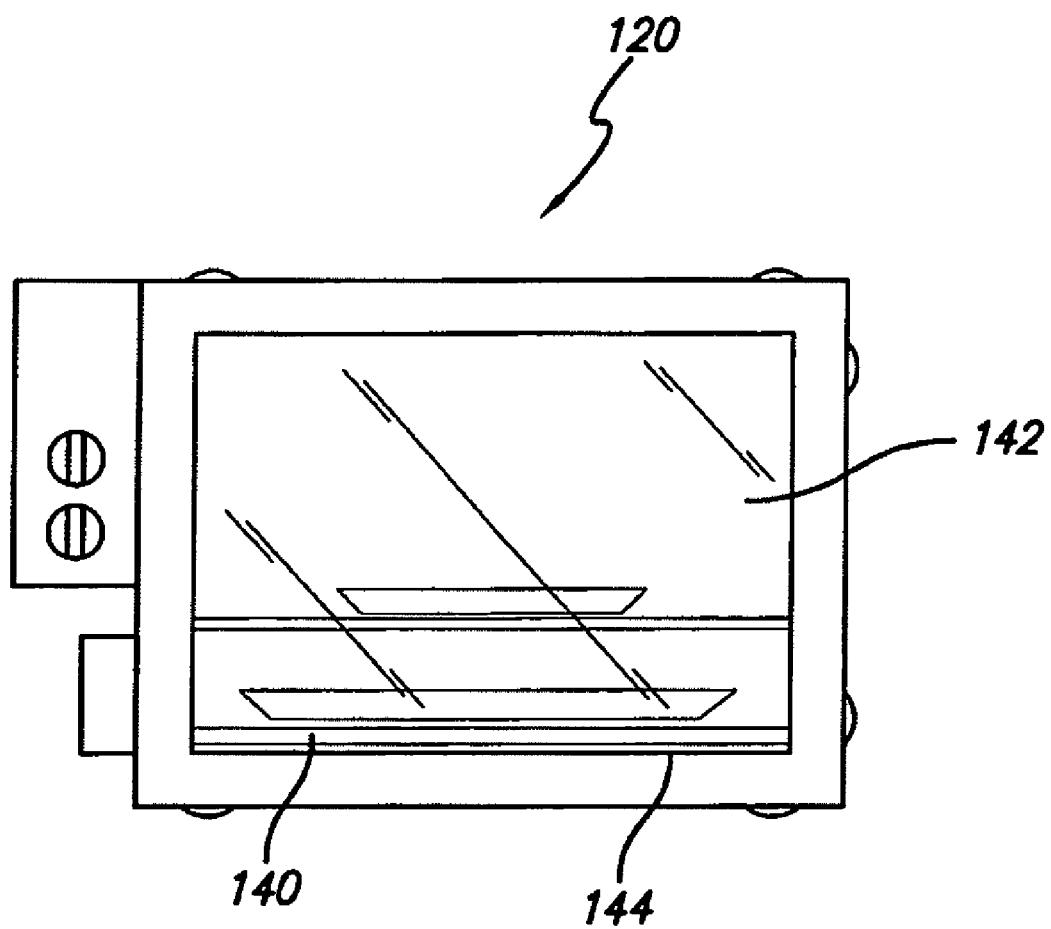
FIG. 19 is a front view of the oven of FIG. 11 positioned for grilling and baking.

An alternative preferred embodiment 120 is illustrated in FIGS. 11 to 19. As shown in FIGS. 17, 18 and 19, this embodiment 120 may be operated in at least three positions simply by resting the unit on different sides.

The first (FIG. 17), locates the heat rods 140 on the roof of the cooking chamber 142 and is suitable for horizontal rotisserie cooking and broiling. As examples, in this position, the rotisserie support apparatus 124 shown in FIGS. 13 and 14 could be used in the cooking chamber 142 to horizontal rotisserie cook shish Kabobs, a roast, a turkey or other food. Also in this position a wire shelf could be positioned below the heat rods 140 to broil a steak or other foods.

The second cooking position is depicted in FIG. 18. Here foods may be cooked on a vertical rotisserie spit. As examples, again using the apparatus 124 shown in FIGS. 13 and 14, a leg of lamb, a roast, a turkey or shish Kabobs might be vertical rotisserie cooked Also in this position (FIG. 18) foods such as cookies, cakes, pizzas, etc. may be radiantly baked, as examples, using round wire shelves resting on legs above the drip pan 144 portion of the apparatus 124. Radiant baking is accomplished in this mode by rotating the food in front of the heat rods 140. Intermittent exposure to radiant heat from the heat rods 140 caused by the food rotation minimizes the chance of burning and may significantly reduce cooking times.

FIG. 19 shows a third cooking position for the embodiment 120. Here the heating rods 140 are positioned just above the floor 144 or the cooking cavity 142 (see FIG. 16).

In this position (FIG. 19) foods may be grilled or baked. As an example, hot dogs or hamburgers or buns 134 might be grilled or cooked on a wire shelf 136 positioned over the heat rods 140 as shown in FIG. 16 either with the door 122 opened (FIG. 12), removed, or closed.

As another example, as shown in FIG. 16 in dotted-lines, the drip tray 130 may be positioned over the heat rods 140 to help make baking in this position (FIG. 19) on wire shelves above the drip tray 130, such as baking of cake and cookies, more even.

The door 122 on this as well as the earlier embodiment 22 is clear and a light 146 mounted in one of the side walls of the oven cavity 142 illuminates the oven cavity 142 and the food cooking within it. This results in the cooking process being a visually stimulating show exhibiting the chefs prowess and enhancing appetites. The movement of rotisserie and radiant cooking may further enhance this show.

Figure 9:
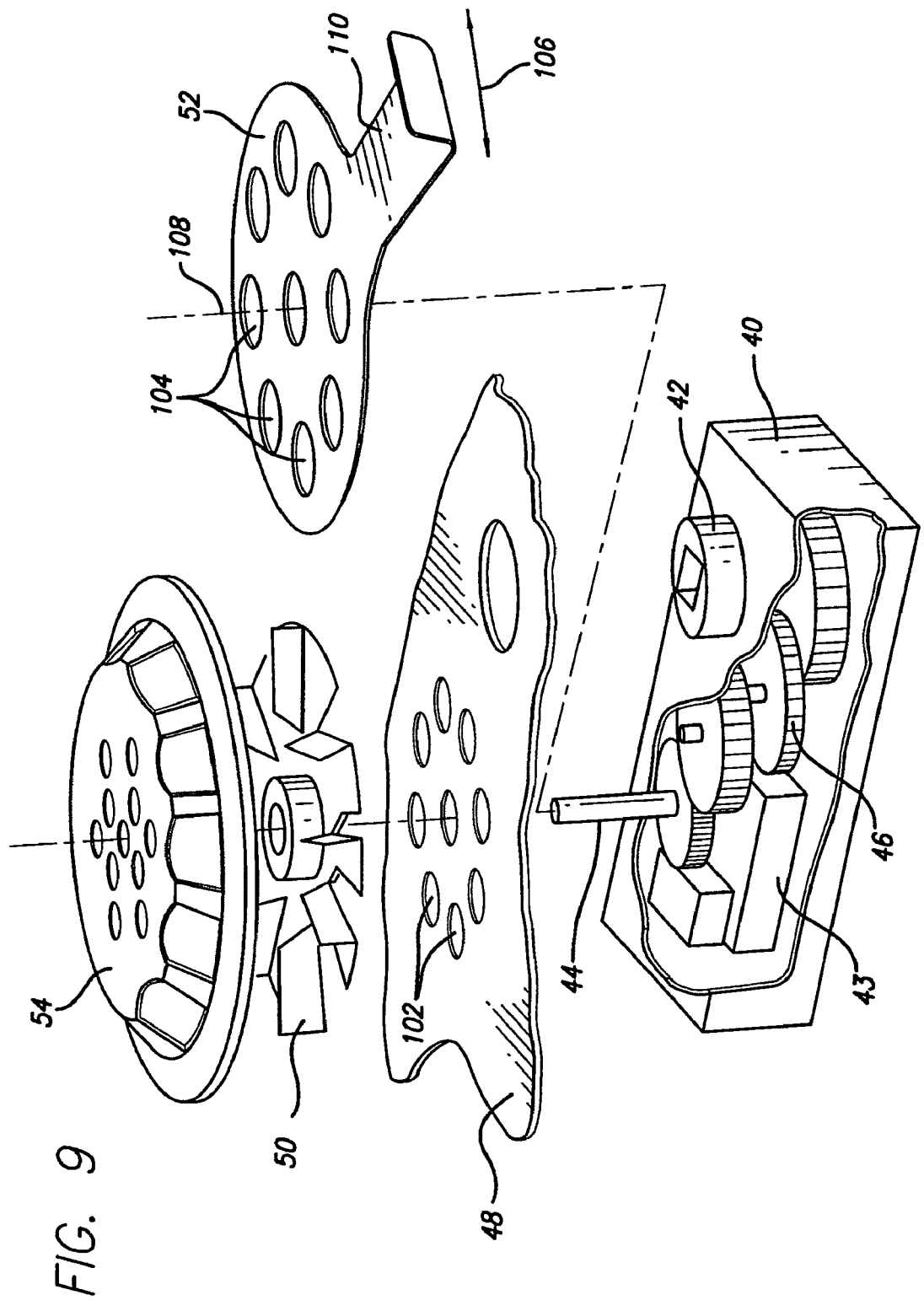
FIG. 9 is an exploded perspective view of the motor drive mechanism of the oven of FIG. 1.

The embodiment 120 may use a rotisserie drive mechanism similar to that illustrated in FIG. 9 which provides: fan 50 forced convection cooking, controllable outside air introduction 102 104 110, and rotisseries rotary drive 42 from a in a simple compact package having only a single motor 43.

Figure 13:
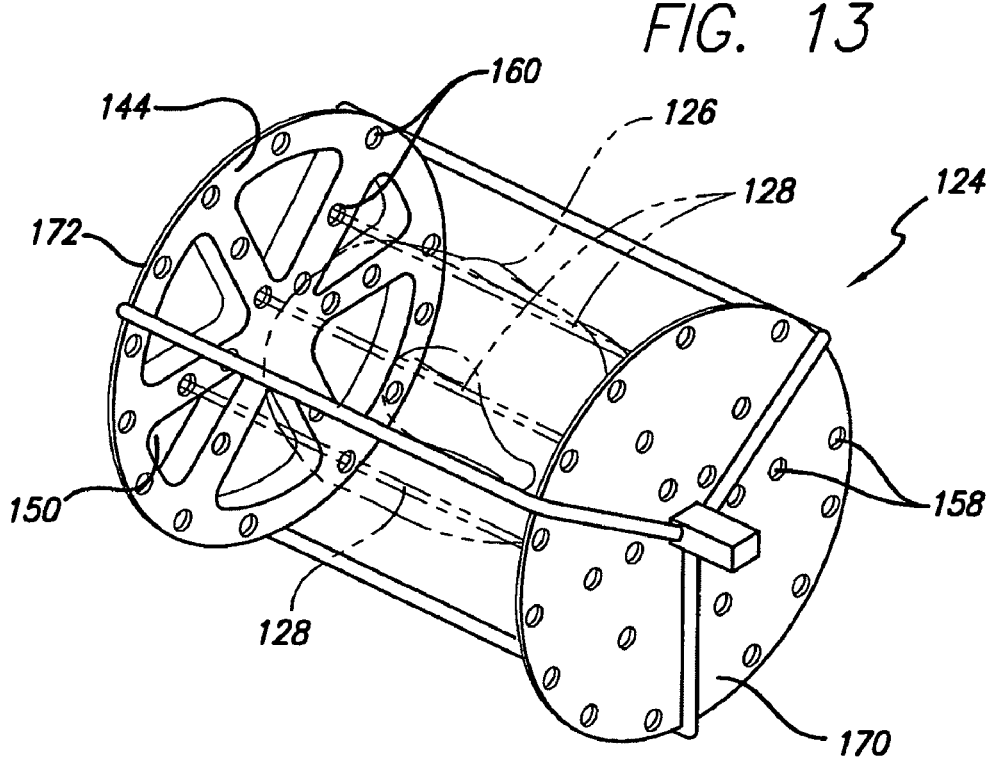
FIG. 13 is a perspective view of a rotisserie holder showing a turkey shown in phantom in being held for rotisserie cooking.
Figure 14:
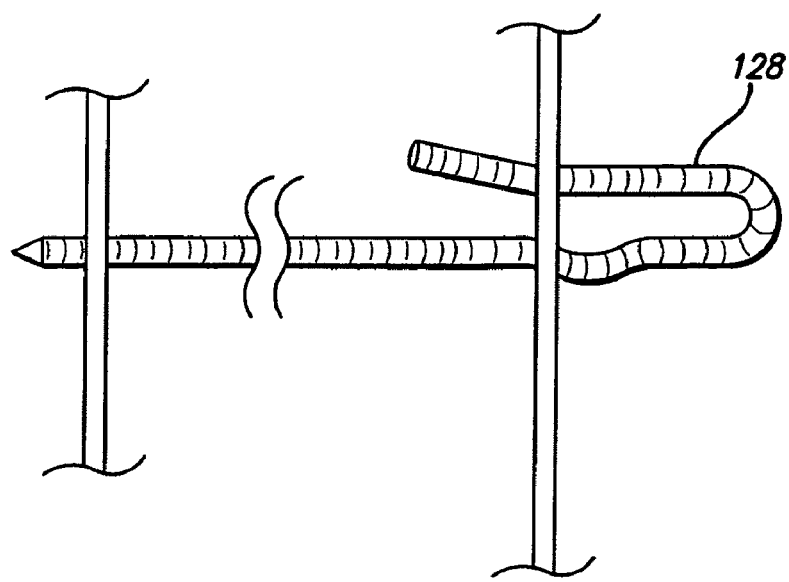
FIG. 14 is a partial detail side view of FIG. 13 illustrating how the rods are held in the rotisserie holder.

The embodiment 120 may also use the rotisserie holder 124 shown in FIGS. 13 and 14. This holder 124 provides several features. First, as shown in FIG. 18, it allows the rotisserie drive mechanism, such as an example illustrated in FIG. 9, to be mounted above foods being vertically rotisserie cooked.

Mounting the rotisserie drive mechanism above food being vertically rotisserie cooked helps prevent water and grease from dripping into and damaging the drive mechanism. It also allows controls, such as thermostats 154 and timers 156, to be mounted in a single, simple, inexpensive module 148 with the drive mechanism, where, when vertical rotisserie cooking is being performed, the controls can be easily viewed and manipulated on the top of the embodiment 120 (see FIG. 18).

The end plates 170 172 of the rotisserie holder 14 may have many rod 128 mounting holes 158 160. Having many holes 158 160 to mount support rods 128 means the rotisserie holder 124 may hold a broad variety of foods either while rotating about a vertical or a horizontal axis. FIG. 13 shows in dotted lines a turkey 126 being supported. By moving the rods 128 a smaller bird such as a chicken, or a steak, or a fish, as examples, might be supported.

Using the rods 128 to cage the foods being rotisserie cooked provides additional advantages of tending to center the foods about the rotisserie axis. Mounting foods on traditional rotisserie spits usually results in the foods being off this center. This causes uneven cooking, and, particularly in horizontal rotisserie cooking, puts strain on motor and drive mechanisms from foods straining to be lifted to the top of the rotisserie arch and then flopping over the top.

Caging rotisserie-cooked foods may hold them firmly, by compressing the foods or by the rods 128 bending like springs around the foods. It may also hold the foods loosely like contents inside a partly full glass cylindrical jar. Where contents are held loosely, they may rotate and roll within the cage created by the rods 128 as the rotisserie rotates, particularly if the rotisserie rotates about a horizontal axis. This may help cook some foods, as examples nuts and vegetables, more evenly.

Using this caging rotisserie support is easy. The user inserts rods 128 between the two end plates 170 172 so that the rods 128 form the bottom half or three-fourths of the food support cage. The food is then dropped into this basket-like cradle and the remainder of the rods 128 are inserted.

The rotisserie holder 124, in vertical rotisserie cooking, can integrally provide a horizontal drip pan 150 (see FIGS. 13 and 18) which can also act as a stable horizontal support surface for food and food support shelves. This eliminates the need for additional parts which provide similar functions.

The rods 128 may also be used as shish kabob sticks. The holder 124 may support many such shish kabob sticks providing capacity exceeding traditional kabob holders. As an example, rods 128 used as kabob holder may be mounted around the perimeter as well as in the interior of the holder 124.

FIG. 15 shows a drip pan 130 with a corrugated floor 162. The raised portions 164 of this floor 162 are designed to align with the heat rods 140 when the pan 130 is placed in the oven cavity 142 to catch dropping grease, oil and debris. When the pan 130 rests below the heat rods as shown in FIG. 16, these raised portions 164 of the pan floor 162 tend to shed grease, debris, and drippings away from being directly beneath the heat rods 140 where they have the greatest tendency to burn and smell.

The optional drip pan cover 132 helps reduce splattering which occurs, as an example, when water drips into hot oil contained in the drip pan 130. This cover also has a corrugated surface 166 that aligns with the heat rods 140 to shed grease, oil and debris away from being near the heat rods 140. This again helps minimize smoke and smell.

Holes 168 in the troughs of the corrugated drip pan cover allow liquid to drain into the drip pan 130 while minimizing the space splattering can spray out of.

As shown in dotted lines in FIG. 16, the drip pan 130 and optional drip pan cover 132 may be mounted above the heat rods 140. This may be used to help even cooking heat distribution and minimize burning from food being directly exposed to radiant energy from the heat rods 140.

When above the heat rods 140, the raised portions 164 of the drip pan 130 perform a similar function to when they are below the rods 140, that is they shed debris away from being close to the heat rods 140 where debris can cause smoke and smell.

Figure 11:
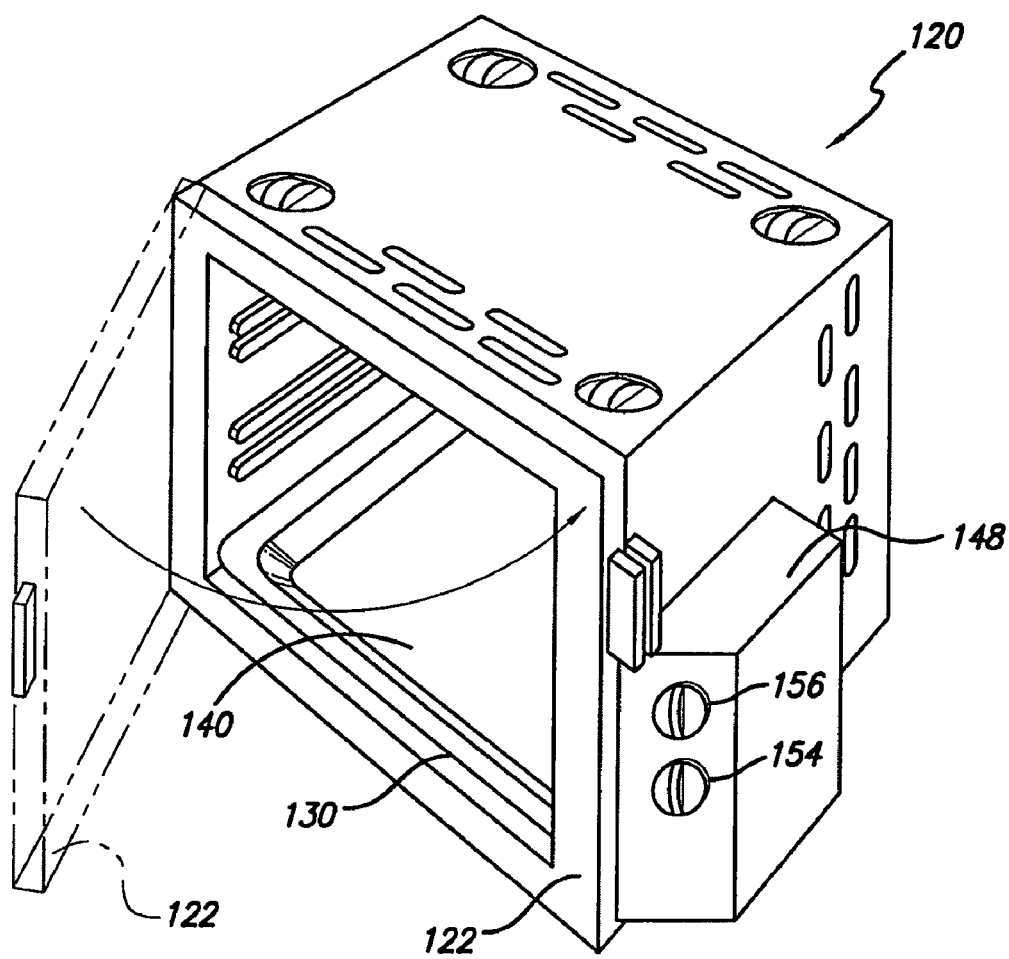
FIG. 11 is a perspective view of an alternative embodiment positioned for horizontal rotisserie cooking.
Figure 12:
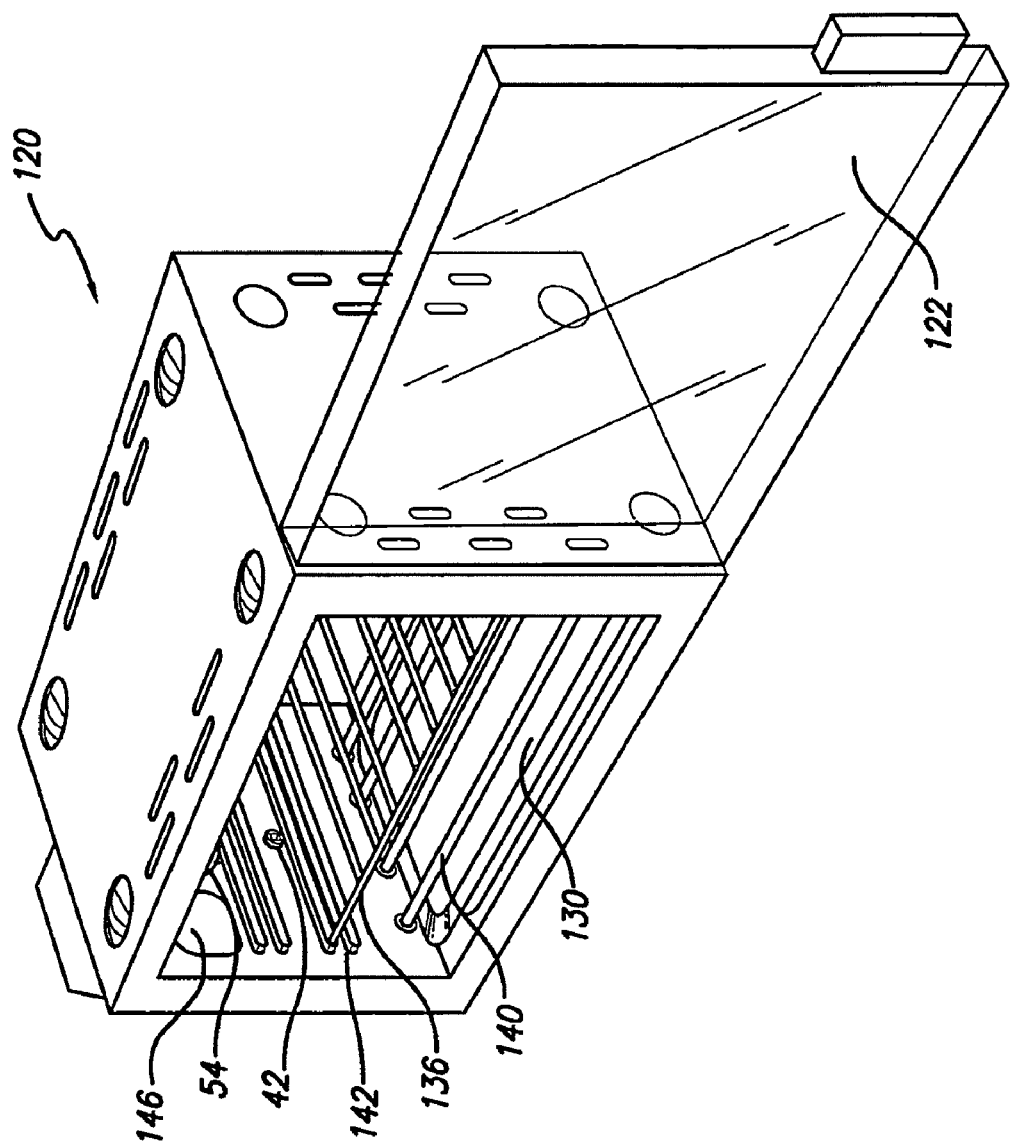
FIG. 12 is a perspective view of the oven of FIG. 11 with its door opened and positioned for grilling and convection baking.

The embodiment 120 has both a timer 156 and a thermostat 154 (FIG. 11). The timer has a steady "on" position as well as time increments up to 120 minutes marked. At the end of any set time increment, the timer sounds a tone and turns off the embodiment.

The thermostat 154 has settings ranging from 100 to 450 degrees F. When oven temperatures exceed the thermostat 154 setting, the thermostat 154 turns off power to the heat rods 140.

The lower temperatures may be suitable for dehydrating foods such as making banana chips, dried apricots, spices, beef and other jerkies, etc. It could also be used for making cultured products such as yogurt and cheeses as well as for heating baby bottles etc. The higher temperatures are needed for baking pizzas, cookies etc.

Alternatively, when the thermostat 154 setting is exceeded, a solenoid could activate 106 the valve plate 52 shown in FIG. 9 so cool outside air is introduced into the oven cavity 142. This would lower oven temperatures while leaving the heat rods 140 activated and thus still cooking through use of radiant energy.

Using the second embodiment 120 is easy. The user places the food to be cooked into the oven cavity 142 on either a rotating 124 or fixed 136 food support. The oven door 122 is closed and the thermostat 154 set. Setting the timer 156 turns on the embodiment 120. At the end of the cooking time the timer sounds and the embodiment 120 turns itself off. The door 122 is opened and the food is removed. Cleanup is easy as the interior walls are coated with a nonstick heat resistant coating.

Different materials may be used to construct the embodiment 120. As examples, 26 gauge painted aluminized steel might be used for embodiment inner and outer oven walls, with non-stick coating used on the inside oven walls. The housing covering the motor drive (FIG. 9), thermostat 154 and timer 156 might be molded from polycarbonate which is capable of withstanding the 225 degree F. heat at that location.

The transparent door 122 might be constructed from tempered glass framed with a silicone glued polysolphone plastic frame. This frame has hinges that can be detached from the rest of the embodiment. The door 122 may thus be removed for cleaning or while grilling (FIG. 19) or for other purposes.

Other materials might also be suitable for the applications described.

What has been herein described is one preferred embodiment of the present invention. Many changes, alterations or modifications to this preferred embodiment will be apparent to one skilled in the art. As examples: dimensions may be greater or lesser than those indicated, such as a wall mounted unit the size of a standard wall mounted home oven or a standard sized toaster with elements which only intermittently radiate heat which more evenly cooks toast with less chance of burning; materials may be altered such as use of glass in the front door or steel or stainless steel (which is generally cooler because of it poor ability to conduct heat) for the outer wall of the enclosure 64; etc.

These and many other changes and alterations are obvious and thus should be considered as part of the description herein which shall be limited in scope and coverage only by accepted claims and their equivalents.

The invention claimed is:

1. A food cooking device comprising:
an enclosure that includes a bottom section and a top section,
wherein the bottom section comprises a bottom outer wall, three side outer walls extending upwardly from the bottom outer wall and a door,
wherein the top section includes a first top wall that is secured to the bottom section,
a heat source disposed in the enclosure,
a motor disposed in the enclosure adjacent the bottom outer wall, wherein the motor includes a rod drive socket, and
a drive arm disposed in and removable from the drive socket, wherein the drive arm includes a bottom portion that is received in the drive socket, a top portion that is received in an opening in the top wall, and an offset portion, wherein the bottom portion and top portion are axially aligned and define a drive axis, wherein the offset portion is offset from the drive axis, wherein the offset portion includes a food support shelf extending generally orthogonally therefrom,
wherein the motor rotationally drives the drive arm, thereby causing the offset portion to define a 360° path.

2. The food cooking device of claim 1 wherein the first top wall is removable.

3. The food cooking device of claim 1 wherein the first top wall can be replaced by a second top wall, and wherein when the enclosure includes the first top wall the enclosure defines a first volume therein and when the enclosure includes the second top wall the enclosure defines a second volume therein, and wherein the second volume is greater than the first volume.

4. The food cooking device of claim 1 wherein the center of the 360° path is axially aligned with the drive axis.

* * * * *